United States Patent Office 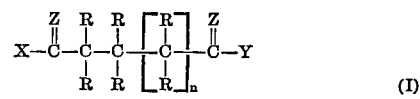

3,433,744
Patented Mar. 18, 1969

3,433,744
REACTION PRODUCT OF PHOSPHOSULFURIZED HYDROCARBON AND ALKYLENE POLYCARBOXYLIC ACID OR ACID DERIVATIVES AND LUBRICATING OIL CONTAINING THE SAME
William M. Le Suer, Cleveland, Ohio, assignor to The Lubrizol Corporation, Wickliffe, Ohio, a corporation of Ohio
No Drawing. Filed Nov. 3, 1966, Ser. No. 591,714
U.S. Cl. 252—46.7        7 Claims
Int. Cl. C10m 1/34, 1/48, 1/08

ABSTRACT OF THE DISCLOSURE

Phosphorus and nitrogen containing reaction products useful as additives in fuels, lubricants, and the like are prepared by phosphosulfurizing hydrocarbon or substituted hydrocarbon compounds to prepare a first intermediate, reacting this phosphosulfurized intermediate with an unsaturated dicarboxylic acid acylating agent to prepare a second intermediate, and finally reacting this second intermediate with an amine compound to prepare the desired phosphorus and nitrogen-containing product. These products impart dispersancy and other desirable properties to fuels and lubricants. A particularly useful product is the one prepared by phosphosulfurizing a polyisobutene with phosphorus pentasulfide, thereafter reacting the phosphosulfurized product with maleic anhydride, and then reacting this product with an alkylene polyamine such as tetraethylene pentamine.

---

This invention relates to oil-soluble, phosphorus-containing dicarboxylic acids and derivatives thereof, methods for preparing these acids and their derivatives, the use of these acids and derivatives as lubricant additives, fuel additives, and intermediates for preparing other compositions of matter, and to lubricating compositions containing these acids and their derivatives.

As is well known in the art, liquid lubricants tend to form sludges in the presence of water and particulate contaminants which are present or formed therein. The problem is one of major concern to the operation of internal combustion engines subjected to stop-and-go use, such as the engines of taxicabs, delivery vehicles, and the like. This type of operation is conducive to the condensation of water in the crankcase and, thus, to the formation of the sludge material. Sludge formation greatly impairs the lubricating qualities of the lubricant.

The problem has been approached by incorporating into the lubricating composition a detergent or dispersant which disperses the particulate matter throughout the oil, thereby preventing the accumulation of the oil-water-particulate containment necessary to the formation of the sludge.

In accordance with the foregoing, it is a principal object of this invention to provide novel compositions of matter.

It is another object of this invention to provide compositions which are useful as additives in lubricants and fuels.

It is a further object of this invention to provide compositions of matter which are useful as detergents or dispersants in lubricating or fuel compositions.

Another object of this invention is to provide improved lubricating compositions containing the novel compositions of this invention.

Still another object of this invention is to provide processes for preparing the novel compositions of this invention.

These and other objects are achieved in accordance with this invention by providing a composition characterized by the presence within its structure of (A) an aliphatic hydrocarbylene dicarboxylic group having at least 2 carbon atoms in the hydrocarbylene radical and (B) a phosphosulfurized hydrocarbon group having at least about 50 aliphatic carbon atoms and attached to said hydrocarbylene radical, wherein each carboxylic group of said hydrocarbylene dicarboxylic group is independently selected from a class consisting of the carboxylic acid group per se (—COOH) or functional derivatives; halides, esters, amides, imides, anhydrides, salts, and amidines. This composition may be represented as $$X-\overset{Z}{\overset{\|}{C}}-\overset{R}{\underset{R}{C}}-\overset{R}{\underset{R}{C}}-\left[\overset{R}{\underset{R}{C}}\right]_n-\overset{Z}{\overset{\|}{C}}-Y \qquad (I)$$

wherein at least one R is a phosphosulfurized hydrocarbon group. The remaining R's are independently hydrogen, an aliphatic hydrocarbyl group such as alkyl, alkenyl or alkynyl, and together one or more pairs of R's can form an additional bond between the carbons to produce one or more "double" or "triple" bonded carbons. The pair of R's which form these additional bonds can be on the same carbon atom or adjacent aliphatic carbons. Thus, if the R's are attached to the same carbon an aliphatic hydrocarbylidene linkage is produced (e.g., alkylidene such as $CH_2=$, $CH_3—CH=$, etc.; alkenylidene such as $CH_3—CH=CH—CH=$, etc.).

The hydrocarbyl and hydrocarbylidene variables represented by R each may contain up to about 10 carbon atoms and preferably not more than 4 carbon atoms with the proviso that the total number of carbon atoms in the hydrocarbylene group joining the two carboxylic acid groups not exceed a total of about 20 carbon atoms and, preferably, not more than 8 carbon atoms. In an especially preferred aspect of this invention, the hydrocarbylene group is an alkylene group separating the carboxylic groups by 2 carbon atoms, the R's other than those representing phosphosulfurized hydrocarbon groups being hydrogen, alkyl, or halo.

The terms "hydrocarbyl," "hydrocarbylidene," and "hydrocarbylene," as used in the specification and claims, are intended to include the hydrocarbon radicals per se as well as such radicals having a nonhydrocarbon substituent provided the nonhydrocarbon substituents do not interfere substantially with the preparation of the composition or destroy the hydrocarbon character of the radicals. Retention of oil-solubility is the important factor. Thus, the presence of substituents on these radicals such as halo, lower alkoxy of up to seven carbon atoms, nitro, alkylmercapto of up to seven carbon atoms, etc., are contemplated as within the scope of the invention though not an essential feature or critical aspect thereof. Usually, for every three carbons in the radical, no more than one such substituent is present.

The variable $n$ is zero or a positive whole number of up to about 8. In the most preferred aspect of the invention, $n$ is zero.

X and Y together with the carbonyl groups (i.e., when Z is oxo) to which they are attached are independently selected from:

(1) The acid group per se, that is the carboxyl group where X and/or Y is hydroxy.

(2) A carboxylic halide group where X and/or Y are halo such as chloro, bromo, iodo, or fluoro.

(3) A carboxy ester group where X and/or Y are —OR' groups where R' is the residue or a compound having at least one alcoholic hydroxyl group.

(4) A carbamyl or substituted carbamyl group wherein X and/or Y are

and R″ and R‴ represent the residue of a primary or secondary amines including amines where R″ and R‴ are joined to form a ring with the nitrogen to which they are attached.

(5) An N-acylcarbamyl where X and/or Y is

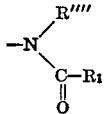

wherein R″″ is hydrocarbyl and $R_1$ is the residue of a carboxylic acid.

(6) An anhydride group wherein X and/or Y is

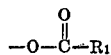

wherein $R_1$ is as defined above.

(7) A carboxylic salt group wherein X and/or Y is $$(-O)^- R_2^{(+)m'}$$

where $R_2$ is a cation of a metal, preferably an alkali or alkaline earth metal, and $(+)_{m'}$ represents the valance of the metal salt forming group, it being obvious that where $m'$ is more than one, additional carboxylic groups from the same or different molecules will be necessary to form the salt. $R_2$ can also be the group

wherein the $R_3$ variables represent the residue of a primary, secondary, or tertiary amine, thus forming an amine carboxylate salt.

(8) An amidino group wherein Z is $=N-R_4$ and X and/or Y is

wherein $R_4$ is the residue of a primary amine and R″ and R‴ are as defined above. The groups $=N-R_4$ and

may be amino groups from the same or different amino compounds.

When the carboxylic groups are esterified, the alcoholic moiety is preferably derived from an aliphatic, cycloaliphatic, or arylaliphatic mono- or polyhydroxy alcohol of up to thirty carbon atoms, the alcohol optionally being substituted with halo, amino, nitro, lower alkoxy, and the like. The preferred alcoholic groups are those derived from (1) alkanols, the term "alkanol" being used to encompass both mono- and polyhydroxy alkanols of up to about twenty carbon atoms, (2) mono- and polyamino alkanols, (3) arylalkanols wherein the aryl group is derived from an aromatic hydrocarbon ring of the benzene series such as benzene, toluene, naphthalene, etc., particularly, where the aryl group is phenyl or lower alkylphenyl and (4) the corresponding mono- or polyamino arylalkanols.

Examples of suitable alcohols are as follows: methanol, ethanol, isopropanol, 3-nitrohexanol, hexanol, isooctanol, cetyl alcohol, allyl alcohol, 1,3-propanediol, ethylene glycol, diethylene glycol and other polyethylene glycols, mono-butyl ether of ethylene glycol, propylene glycol, 1,3-hexanediol, 1,9-nonanediol, glycerol, ethanol amine, diethanol amine, triethanol amine, 2-hydroxy butylene diamine-1,4, cyclopentanol, cyclohexanol, 1,4-dihydroxycyclohexane, 2-hydroxyethylhexane, benzyl alcohol, p-nitrophenylpropanol, 2 - phenylpropanediol - 1,3, naphthylethyl alcohol, pentaerythritol, 3-chloro-1,2-propanediol, p-(2-hydroxyethyl)-aniline, 4-chloro-naphthylethyl alcohol, etc.

Where X and/or Y are derived from amines, that is, where

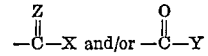

are carbamyl or N-substituted carbamyl groups, a portion of an N-acyl carbamyl group, an amine carboxylate group, or an amidino group, the amine from which these various groups are derived can be mono- or polyamino aromatic, aliphatic, cycloaliphatic, or heterocyclic amines having at least one primary or secondary amino group. Thus, in the group $-NR″R‴$,

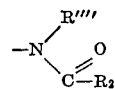

$HN(R_3)_3$ and $=N-R_4$ the variables R″, R″″ and $R_4$ can each be hydrogen, aliphatic, cycloaliphatic, or aromatic hydrocarbyl radicals of up to about thirty carbon atoms, and R″ and R‴ are two of the $R_3$'s groups together with the nitrogen to which they are attached can form a heterocyclic ring.

Illustrative of the types of amines contemplated to be within the scope of the present invention are ethylamine, butylamine, isobutylamine, octylamine, N-methylpropylamine, N-ethylheptylamine, diamyl amine, didecylamine, aniline, cyclohexylamine, 1,3-diaminocyclopentane, phenylenediamine, N-ethyl-anisidine, benzylamine, phenethyl amine, hexamethylene imine, piperidine, dodecylamine, hexahydryl-1,3,5-triazine, indol, oxazoladine, iminoethyl piperazine, ethanolamine, dipropanolamine, and the like.

The preferred amine groups are derived from the polyamines, especially alkylene polyamines corresponding to the formula

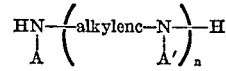

wherein $n$ is an integer of up to about twenty but preferably not more than ten carbons and A and A' are the same or different and each is a hydrocarbyl radical or hydrogen, and the alkylene group contains up to about ten carbon atoms and, preferably, from one to about seven carbon atoms. These alkylene amines encompass principally methylene amines, ethylene amines, propylene amines, butylene amines, pentylene amines, hexylene amines, heptylene amines, octylene amines, including the various isomeric forms thereof (e.g., butylenediamine-1,4; -1,3; or -1,2) and other polymethylene amines, and also the cyclic analogs and the higher homologs of such amines. Specific examples include: ethylenediamine, triethylenetetramine, propylene diamine, decamethylenediamine, octamethylenediamine, di(heptamethylene)triamine, tripropylene tetramine, tetraethylenepentamine, trimethylenediamine, pentaethylenehexamine, di(trimethylene)triamine, and the like. Higher homologs such as are obtained by condensing two or more of the above illustrated alkylene amines are also useful.

The ethylene amines are especially useful. They are described in some detail under the heading "Ethylene Amines" in Encyclopedia of Chemical Technology, Kirk and Othmer, Vol. 5, pp. 898–905, Interscience Publishers, New York (1950). These compounds are prepared most conveniently by the reaction of an alkylene chloride with ammonia. This reaction results in the production of complex mixtures of alkylene amines, including cyclic condensation products such as piperazine and aminoethyl piperazines. The reaction mixture per se can be used in the process of the invention or the pure alkylene amines themselves may be employed. An especially useful alkylene amine for reasons of economic availability, and the effectiveness of the product derived therefrom is a mixture of ethylene amines prepared by the reaction of ethylene chloride and ammonia and having a composition having an average of from 3 to 11 amino groups per polyamine molecule.

Hydroxyalkyl-substitued alkylene amines, containing 1 or more N-hydroxyalkyl substituents, are also contemplated for use in this invention. These hydroxy-substituted alkylene amines are preferably those in which the alkyl group is a lower alkyl group, i.e., those having up to 7 carbon atoms. Examples of such amines include N-2-hydroxyethyl-ethylenediamine, N,N'-bis(2-hydroxyethyl)-ethylenediamine, di-(3-hydroxypropyl)-substituted tetraethylenepentamine, N-(3-hydroxypropyl)tetramethylenediamine, and the like.

Also contemplated as within the scope of this invention are those amines obtained as condensation products of the above-illustrated alkylene amines or hydroxyalkylene amines through their amino radicals or the hydroxy radicals. Condensation through the amino radicals results with the removal of ammonia and condensation through the hydroxy group results in products having ether linkages and is accompanied by removal of water.

The group of diverse amines suitable for preparing the presently claimed compounds is further illustrated as follows: ureas, thioureas, hydrazines, guanidines, amidines, amides, thioamides, cyanamides, etc. Specific examples illustrating this diverse group of amines are: hydrazine, phenylhydrazine, N,N'-diphenylhydrazine, octadecylhydrazine, benzoylhydrazine, urea, thiourea, N-butylurea, stearamide, oleylamide, guanidine, 1,3-diphenylguanidine, 1,2,3 - tributylguanidine, benzamidine, octadecamidine, N,N'-dimethylstearamidine, cyanamide, dicyandiamide, guanylurea, aminoguanidine, etc.

The phosphosulfurized hydrocarbon portion of the claimed composition is derived from the well known class of phosphosulfurized hydrocarbons as illustrated in the following U.S. Patents 2,712,528, 2,715,612, 2,827,433.

However, to be suitable for the present invention, the hydrocarbon from which the phosphosulfurized hydrocarbon is derived must contain at least about fifty aliphatic carbon atoms. A particularly useful source of such hydrocarbons are the polyolefins, particularly polymers of monoolefins having from two to about thirty carbon atoms. The especially useful polymers are those derived from 1-monoolefins such as ethylene, propene, 1-butene, isobutene, 1-hexene, 1-octene, 2-methyl-1-heptene, 3-cyclohexyl-1-butene, and 2-methyl-5-propyl - 1 - hexene. Polymers of medial olefins, i.e., olefins in which the olefinic linkage is not at the terminal position, likewise are useful. They are illustrated by 2-butene, 3-pentene, and 4-octene.

Also useful are the interpolymers of these monoolefins, such as illustrated above, with other polymerizable olefinic substances including aromatic olefins, cyclic olefins, and polyolefins. These interpolymers include copolymers prepared by polymerizing isobutene with styrene; isobutene with butadiene; propene with isoprene; ethylene with piperylene; isobutene with chloroprene; isobutene with p-methylstyrene; 1-hexene with 1,3-hexadiene; 1-octene with 1-hexene; 1-heptene with 1-pentene; 3-methyl-1-butene with 1-octene; 3,3-dimethyl-1-pentene with 1-hexene; etc., terpolymers such as those prepared from the polymerization of isobutene, styrene, and piperylene are also contemplated as sources of the hydrocarbon portion for the phosphosulfurized hydrocarbons.

Specific examples of suitable interpolymers include the copolymer of 95 percent (by weight) of isobutene with 5 percent styrene; the terpolymer of 98% isobutene, 1% piperylene, and 1% chloroprene; terpolymer of 95% isobutene, 1% chloroprene, and 1% piperylene; terpolymer of 95% isobutene, 2% 1-butene, and 3% of 1- hexene; terpolymer of 60% isobutene, 20% 1-pentene and 20% of 1-octene; copolymer of 80% of 1-hexene and 20% of 1-heptene; terpolymer of 90% of isobutene with 2% of cyclohexene and 8% of propene; and copolymer of 80% of ethylene and 20% of propene.

Other sources of the hydrocarbon are the high molecular weight, substantially saturated petroleum fractions; highly refined, high molecular weight white oils; and synthetic alkanes obtained by hydrogenation of high molecular weight olefin polymers or other high molecular weight olefinic substances.

Of all these hydrocarbons, a preferred hydrocarbon group is the class of polyolefins having a molecular weight of about 700 to about 100,000 or somewhat higher. Included within this group are the interpolymers as well as the homopolymers. Especially useful are the polyolefins having a molecular weight of about 700 to about 5000. Because of its availability, ease of reaction and other considerations, polyisobutylene is the most preferred polyolefin.

The phosphosulfurized hydrocarbons are prepared according to conventional processes amply illustrated in the above cited patents. The hydrocarbon is heated in the presence of phosphorus and sulfur or a phosphorus sulfide at a temperature of about 100° C. to about 325° C. and preferably from about 150° C. to about 300° C. A nonoxidizing atmosphere can advantageously be employed during the heating, for example, nitrogen or helium. The ratio of the phosphorus sulfide to hydrocarbon can vary over very wide ranges. Suitable phosphorus sulfides include $P_2S_3$, $P_2S_5$, $P_4S_3$, $P_4S_5$, and the like with phosphorus pentasulfide ($P_2S_5$) being preferred. Normally, the ratio of phosphorous sulfide to hydrocarbon will be such that the phosphosulfurized hydrocarbon product will have from about 0.5% to about 10% by weight phosphorous. Preferably, the product will contain from about 1% to about 3% phosphorous. If desired, the phosphorus sulfide can be employed in combination with elemental sulfur.

Generally, the products of the invention should be substantially free of hydrogen sulfide before adding them to a lubricant. Removal of hydrogen sulfide can be readily accomplished according to known techniques by blowing the product with nitrogen, steam, alcohols, etc., at temperatures of about 70° to about 350° C. Heating at reduced pressures, with or without blowing, is also conducive to removal of hydrogen sulfide. The steps employed to remove hydrogen sulfide can be employed at the completion of the phosphosulfurization reaction or at any later time in the preparation of the products of the invention. Sometimes it is desirable to treat both the phosphosulfurized hydrocarbon and the first product to insure removal of substantially all of the hydrogen sulfide.

The unsaturated, non-aromatic hydrocarbylene dicarboxylic acids and derivatives thereof which are suitable for use as reactants in the preparation of the compounds of the present invention are illustrated by the following formula:

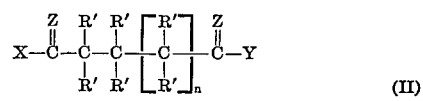

(II)

wherein the R' variables are as defined for R in Formula I above with the exception that none is a phosphosulfurized hydrocarbon group and with the further limitation that at least one R' variable contains at least one ethylenic bond or a pair of the R' variables on the same or two adjacent carbon atoms together form an additional carbon to carbon bond so that there is at least one ethylenically unsaturated bond in the hydrocarbylene group joining

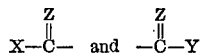

The variables X, Y, Z, and n are as defined hereinabove for Formula I.

Illustrative examples of the hydrocarbylene group bridging the two carboxylic groups, that is, examples of

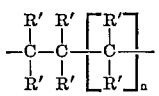

are as follows:

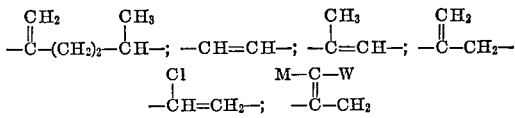

where M and W are hydrogen or lower alkyl;

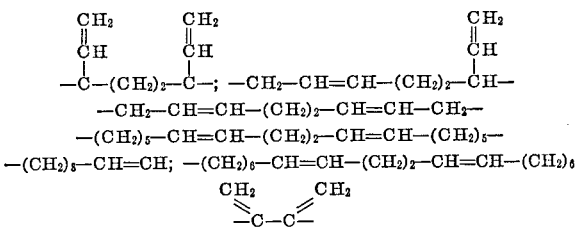

The dibasic acids and esters containing these and other hydrocarbylene groups are old and/or methods for their preparation can be found, for example, in U.S. Patents 2,391,824, 2,498,371, 2,721,878, 2,811,551, 2,826,602, 2,870,196, and 2,957,907.

Due to the availability and other economic considerations as well as performance of the final products prepared therefrom, the following class of ethylenically unsaturated non-aromatic hydrocarbon acids and derivatives thereof are particularly preferred.

 (III)

wherein X, Y, and Z are as previously defined for Formulae I and II above and the R's are each selected from the class consisting of lower alkyl of up to four carbon atoms, halo, and hydrogen.

Specific examples of acids falling within Formulae II and III are muconic acid, traumatic acid, maleic acid, mesaconic acid, citraconic acid, itaconic acid, fumaric, glutaconic acid, α-methylene-α'-methyladipic acid, 2,3-dicarboxy-1,3-butadiene, 8,12-eicosadienedioic acid, chloro maleic acid, and the like.

An especially preferred group of acids are maleic acid, chloromaleic acid, and itaconic acid.

It should be understood that when reference is made to a particular acid, the corresponding esters, amides, halides, anhydrides, amidines, imides, and salts, as set forth in the Formulae II and III are also contemplated. For example, in the especially preferred group of acids listed above, that is, maleic acid, chloromaleic acid, and itaconic acid, maleic acid is intended to be generic to maleic anhydride, the most preferred dibasic acid reactant.

The acids encompassed by Formulas I and II are well known in the art as is readily recognized by the partial listing of representative examples hereinabove. The various derivatives thereof are also known or can be easily prepared according to conventional chemical reactions well known in the art. A few of these reactions are summarized briefly as follows:

(1) Acyl halides

The acyl halides can be prepared from the corresponding carboxy acids by reaction with the appropriate halogenating agente such as phosphorus trichloride, phosphorus tetrachloride, thionyl chloride or sulfuryl chloride. The product of such reactions will be the corresponding acyl chlorides. By using a corresponding bromine analog of the above halogenating agent, the carboxylic group can be converted to the acyl bromide. If desired, the iodide can be prepared by reacting the acyl chloride with calcium iodide or dry hydrogen iodide while the fluorides can be obtained from the reaction of the acyl chlorides with antimony fluoride or hydrogen fluoride.

(2) Esters

The esters can be prepared by reacting the acyl halide, particularly the acyl chloride, with an alcohol. Similarly, the anhydride may be reacted with alcohols to produce the ester.

(3) Amides

Many conventional procedures are available for the acylation of amines with carboxylic acids. Generally, the halides, anhydrides, or lower alkyl esters can be reacted with an amine having at least one available amino hydrogen at a temperature of about 50°–110° C. although higher or lower temperatures may be employed.

(4) N-acylamides

The N-acylamides are prepared in the same manner as the amides, the only difference being that with the N-acylamides two acyl groups react with the same amino nitrogen. The two carboxyl groups bonded to the nitrogen forming the amido function may be carboxyl groups of the same or different acids. For example, when an anhydride is reacted with a primary amine both carboxyl groups forming the anhydride can react with the amino nitrogen to form the N-acylamido group. If the anhydride involved two carboxyl groups of the same acid, such as maleic anhydride, the resulting N-acylamides are cyclic whereas, if the anhydride was formed from carboxyl groups of two different acids, the resulting N-acylamide is linear.

(5) Anhydrides

The anhydrides contemplated by this invention include those carboxylic acid anhydrides wherein both carboxyl functions of the same dibasic acid form the anhydride group as well as those anhydrides where either one or both of the carboxy groups

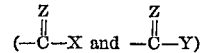

form carboxylic acid anhydride groups with other carboxylic acids including other acids of the type described in Formulae II and III. Many standard processes are available for the preparation of these anhydrides. Some of the processes are specific to a particular anhydride. For example, maleic acid can be heated to about 100° C. under reduced pressure and it will undergo dehydration and form maleic anhydride. Maleic anhydride is also obtained by the catalytic air oxidation of benzene using vanadium pentoxide as the catalyst at a temperature in the range of 400° to 500° C. On the other hand, general methods of preparing anhydrides are also available. The reaction of a carboxylic acid chloride with a carboxylic acid sodium salt readily produces the anhydride. This procedure is particularly useful if it is desired to form the anhydride from two different carboxylic acid groups. Where the anhydride is to be formed from carboxylic groups of the same type of acid, that is, from two moles of the acids of Formula II or III, a useful procedure involves the careful distillation of acetic acid from a mixture of the acids and acetic anhydride.

(6) Salts

Salts of the carboxylic acid groups are formed merely by neutralization of the acid with a base. For example, neutralization of the carboxylate group with alkali or alkaline earth metal hydroxides, carbonates, bicarbonates, etc. or amines, produces the corresponding alkali, alkaline, or amine carboxylate salt. All that is required is that the base and the carboxylate group be brought into contact with each other.

(7) Amidines

Linear and cyclic amidines are contemplated as being within the scope of this invention. The amidines are prepared in the same manner as the amides except that it is obviously necessary that there be two amino groups available for reaction with a single carboxyl group, one of which must be a primary amino group and the other being either primary or secondary. The amidine group is formed by heating together the carboxylic acylating agent and the amine at a temperature of about 120° C. to about 250° C. but generally above about 150° C. If the amino groups entering into the formation of the amidine linkage are attached to separate amine molecules, the amidine is linear whereas, if the amino groups are attached to the same amine molecule, the resulting amidine compound is cyclic. Thus, if a carboxylic acyl chloride group is heated with a polyalkalene polyamine such as diethylene triamine, the resulting product may contain cyclic amidine groups if the carboxyl group reacts with two amino groups of the same molecule of diethylenetriamine, or linear if the carboxyl group reacts with two amino groups from two different molecules of diethylene triamine.

It will be obvious that it is also possible to convert the esters, anhydrides, amides, and halides to the carboxyl groups per se by conventional hydrolysis techniques and to convert the basic salt to the acid by acidification. Furthermore, by controlling the ratio of reactants and/or by proper selection of the dicarboxylic starting material it is possible to convert one of the carboxyl groups to a derivative different from the other. Thus by reacting one mole of maleic acid with one mole of thionyl chloride, the major part of the product will be the mono chloride of maleic acid. Subsequently, if this mono acyl halide is reacted with one equivalent of an amine or alcohol, the monoamide or monoester will be formed. The selection of the particular reactants and reaction conditions necessary to convert one carboxyl group to a given function without converting the other or with the subsequent conversion of the other carboxy group to a different function, are well within the skill of the art and need not be discussed in detail herein.

Moreover, the conversion of the carboxy groups to their various derivatives need not take place prior to the reaction of the phosphosulfurized hydrocarbon and the dicarboxylic acid reactant. That is, if maleic anhydride is reacted with the phosphosulfurized hydrocarbon compound, the resulting product can then be reacted with amines, alcohols, and the like to produce the corresponding amides, ammonium salts, amidines, esters, and the like as desired.

The products of the present invention are readily prepared simply by mixing the acid reactant, that is, an acid corresponding to Formula II or III above with the phosphosulfurized hydrocarbon compound. Upon mixing, a reaction ensues whereupon the phosphosulfurized hydrocarbon compound reacts either through the phosphorus-sulfur radical of the phosphosulfurized hydrocarbon with the ethylenic linkage in the hydrocarbylene dicarboxylic acid reactant or with an active carbon in the latter reactant. If more than one ethylenic linkage is present in the acidic reactants, more than one phosphosulfurized hydrocarbon constituent may add to the acid reactant providing, of course, there is sufficient phosphosulfurized hydrocarbon present in the reaction mixture.

In order to expedite the reaction it is desirable to heat the reaction mixture at a temperature within the range of about 50° C. to about 350° C. The upper limit of the reaction temperature is determined by the decomposition temperature of the reactants and a consideration of the desired final product. Generally, heating the reaction mixture to a temperature of about 100° C. to about 250° C. will accomplish the reaction efficiently with little or no decomposition of reactants or final product.

The ratio of reactants is not critical and can vary over a wide range. Normally, the equivalent weight ratio of phosphosulfurized hydrocarbon to the dicarboxylic acid reactant will be from about 0.5:1.0 to about 3.0:1.0, the equivalent weight of the acid reactant being based on the number of ethylenic linkages in the acid while the equivalent weight of the phosphosulfurized hydrocarbon depends on the number of phosphorus-sulfur substituents on the hydrocarbon. For example, a phosphosulfurized polyisobutylene polymer having one phosphorus-sulfur substituent has an equivalent weight of 750 and the equivalent weight of maleic anhydride is 98. However, it should be kept in mind that it may be advantageous to remove unreacted reactants from the product. If this is so, then a slight excess of the acidic reactant may be desirable since generally it will be much easier to remove unreacted acidic reactant than to remove unreacted phosphosulfurized hydrocarbon. It is for this reason that it is normally preferred to react substantially stoichiometric equivalents of the two reactants to produce the products of the invention.

Since the phosphosulfurized hydrocarbon reactant is normally a liquid, being derived from a normally liquid hydrocarbon, it is not necessary that any additional reaction medium be present. However, if desired, an inert organic solvent can be added to the reaction mixture to increase its fluidity. The selection of a suitable solvent will depend upon the reaction temperature which the mixture is to be heated. Suitable solvents include benzene, toluene, and other alkyl benzene, alkanes having seven or more carbon atoms, mineral oils, and the like.

While not essential, the use of an inert atmosphere, such as nitrogen or helium, is desirable to eliminate or reduce the oxidation of the reactants or solvents and the final products, particularly where higher reaction temperatures are involved.

A more detailed description of the preparation of the compounds of the present invention appears in the following examples.

EXAMPLE 1

(A) Fifteen hundred grams of a polyisobutylene polymer having an average molecular weight of 750 is heated to 100° C. under an atmosphere of nitrogen. Thereafter, 177.6 grams of phosphorus pentasulfide and 25.6 grams of sulfur are added slowly to the hot polyisobutylene. This reaction mixture is then stirred and heated at 250° C. for 4 hours while maintaining the nitrogen atmosphere during which hydrogen sulfide is evolved. The reaction mixture containing the phosphosulfurized polyisobutylene is then cooled to 106° C. and 550 grams of mineral oil is added to dilute the reaction mass. The reaction mass is then filtered, the filtrate being a mineral oil solution of the phosphosulfurized polyisobutylene. This solution is a clear, brown, slightly viscous material containing 1958 grams of the desired product.

(B) A portion of the mineral oil solution of the product of (A) containing 1115 grams of the phosphosulfurized polyisobutylene is heated to 100° C. and thereafter 98 grams of maleic anhydride are added thereto. The mixture is then heated to 200° C. for 5 hours. During this heating step, the reaction mass is blown with nitrogen gas and hydrogen sulfide is evolved. At the end of the heating step the reaction mixture was cooled to 160° C. and filtered. The filtrate contained 905 grams of the anhydride reaction product of the phosphosulfurized polyisobutylene and the maleic anhydride dissolved in mineral oil. The filtrate was a dark, viscous liquid.

(C) An 800 gram portion of the product of (B) dissolved in mineral oil is heated to 80° C. and thereafter 41 grams a commercial mixture of polyethylene polyamines containing about 34% by weight nitrogen is added. The reaction mixture is then heated to 150° C., held there for 4 hours while it is blown with nitrogen. Additional hydrogen sulfide is evolved. The reaction mixture is then heated at reduced pressure for 30 minutes at 150° C. to promote removal of any remaining hydrogen sulfide. The resulting reaction mass is filtered, producing a filtrate containing 598 grams of phosphosulfurized acylated amine reaction product.

EXAMPLE 2

(A) Following the procedure of the Example 1(A), a phosphosulfurized polyisobutylene is prepared from the following reactants: 1500 grams of polyisobutylene (average molecular weight 750), 177.6 grams of phosphorus pentasulfide, and 51.2 grams of sulfur.

(B) The anyhydride reaction product of 98 grams of maleic anhydride and 1115 grams of the product of the Example 2(A) dissolved in mineral oil is prepared according to the same technique as set forth in the Example 1(B).

(C) Using the procedure of Example 1(C), 736 grams of the product of Example 2(B) is reacted with 33 grams of a commercial mixture of polyethylene polyamines containing an average of 3 to 11 amino groups per molecule. The filtrate contains 522 grams of the phosphosulfurized acylated amino dissolved in mineral oil.

EXAMPLE 3

(A) Following the same procedure of Example 1(A), 1500 grams of polyisobutylene (average molecular weight 750), 177.6 grams of phosphorus pentasulfide at 12.8 grams of sulfur are reacted to produce a phosphosulfurized polyisobutylene.

(B) To a portion of the mineral oil solution of 3(A) containing 1115 grams of the phosphosulfurized polyisobutylene there is added 98 grams of maleic anhydride which is reacted according to the technique of the Example 1(B).

(C) Employing the procedure of Example 1(C), 41 grams of the commercial mixture of polyethylene polyamines of Example 1(C) are acylated with 836 grams of product of Example 3(B) dissolved in oil.

EXAMPLE 4

(A) A reaction mixture consisting of 1365 grams of the phosphosulfurized polyisobutylene prepared according to Example 1(A) and 98 grams of maleic anhydride is heated for 5 hours while maintaining the temperature within the range of 180° to 200° C. Thereafter, the reaction mass is stripped by heating at 200° C. at reduced pressure (3 mm. Hg) to drive off hydrogen sulfide. This reaction mass is diluted with 300 grams of mineral oil and filtered.

(B) The phosphosulfurized polyisobutylene-maleic anhydride reaction product of 4(A) is reacted with 31 grams of the same commercial amine used in Example 1(C) according to the following procedure: The amine is mixed with 1190 grams of the product of 4(A) and 350 grams of mineral oil at 70° C. The amine is added and the reaction mixture heated to 150° C. and held in the range of 150° to 160° C. for 4 hours and thereafter filtered. The phosphosulfurized acylated amine product was dissolved in the mineral oil filtrate.

The reaction products of Examples 1 through 4 consist of mixtures of compounds resulting from the reaction of various amino groups with the carboxylic anhydride groups. The product contains amido, N-acylamido, and amidino groups.

Since all of the above reaction products, including the mixtures thereof, are suitable as lubricant additives, it is not necessary to separate these various products. This is particularly advantageous from the economic standpoint as separation of such mixtures would involve rather costly and time consuming procedures seriously limiting commercial utilization of the products.

Following the procedures of Examples 1–4 above, other reactants can be utilized to produce analogous reaction products. Examples 5–35 illustrate a few of the many possible variations of the present invention. For convenience, these examples are presented in tabular form below.

Some of these examples have been modified so that there is an excess of amine reactant whereas in others there is an excess of the acidic reactant. Where there is an excess of the acidic reactant, some of the acid groups (—COOH, —CO—O—OC—, —COOR, etc.) present may not react with any amine thereby producing compounds containing the anhydride group, the carboxy group, the carbalkoxy group, etc., as well as the various amine derivatives mentioned above (amide, N-acylamide, amine salt, amidine). Again, it is not necessary to separate these products as they can be employed directly in the form of their respective mixtures as lubricant additives.

| Ex. | Following Procedure of— | Polyisobutyl (750) | $P_2S_5$ | S | Maleic Anhydride | Commercial Amine Mixture |
|---|---|---|---|---|---|---|
| 5 | Ex. 1 | | | | | 1 mole of normal propylamine. |
| 6 | Ex. 1 | | | | | 2 moles of normal octylamine. |
| 7 | Ex. 2 | | | | | 2 moles of di-normal butylamine. |
| 8 | Ex. 2 | | | | | 3 moles of N-ethoxyethyl-ethylamine. |
| 9 | Ex. 3 | | $P_4S_3(430)$ [2] | a | Mole of diethylmalate | 1 mole of ethylenediamine. |
| 10 | Ex. 1 | Polypropylene (1,000) [1] | $P_4S_3(258)$ [2] | | | 0.5 mole of 1,3-butylenediamine. |
| 11 | Ex. 2 | Polyethylene (1,500) [1] | | | | 1.1 moles of N,N-diethylpropylenediamine. |
| 12 | Ex. 3 | Polyisobutylene (1,000) [1] | $P_4S_7(236)$ [2] | a | | 2.5 moles of N,N-diethyl-ethylenediamine. |
| 13 | Ex. 1 | | | | ½ mole of maleic acid replaces ½ mole of maleic anhydride. | |
| 14 | Ex. 1 | | | | | 2 moles of aniline. |
| 15 | Ex. 1 | | | | | 1 mole of 1,4-phenylenediamine. |
| 16 | Ex. 3 | | | | | 2.0 moles of 4-methoxyaniline. |
| 17 | Ex. 1 | | | | | 2.5 moles of cyclopentylamine. |
| 18 | Ex. 1 | Polyisobutylene (10,000) [1] | | | 1 mole of chloromaleic acid | 0.5 mole of 4,6-diaminecyclohexene-1. |
| 19 | Ex. 2 | Polyisobutylene (5,000) [1] | | | 1 mole of chloromaleic anhydride | |
| 20 | Ex. 2 | Terpolymer of isobutylene: piperylene:chloroprene (98:1:1)% by wt. (10,000). [1] | | | | |
| 21 | Ex. 1 | | | a | 1 mole of citraconic anhydride | |
| 22 | Ex. 1 | | | | 1 mole of dimethyl maleic anhydride. | |
| 23 | Ex. 1 | Polyisobutylene (50,000) [1] mineral oil, solvent doubled in quantity. | | | ½ mole of itaconic anhydride replaced ½ mole or maleic anhydride. | |
| 24 | Ex. 1 | Polypropylene (1,000) [1] | | a | 1 mole of maleic acid | |
| 25 | Ex. 3 | Chlorinated copolymer of isobutylene:isoprene (90:10)% by wt.; (28,000). [1] | | | | |
| 26 | Ex. 3 | | | | | 2 moles of piperazine. |
| 27 | Ex. 1 | | | | | 2 moles of aminopyridine. |
| 28 | Ex. 1 | | | | | 3 moles of aminopiperidine. |
| 29 | Ex. 1 | | | | | 2.0 moles of benzylamine. |
| 30 | Ex. 1 | Copolymer isobutylene: cyclohexene:propylene (90:2:8)% by wt. (10,000). [1] | | | | |

| Ex. | Following Procedure of— | Reactant at Top of Columns Replaced With— | | | | |
|---|---|---|---|---|---|---|
| | | Polyisobutyl (750) | $P_2S_5$ | S | Maleic Anhydride | Commercial Amine Mixture |
| 31 | Ex. 1 | Copolymer isobutylene: styrene (95:5)% by wt. (4500).[1] | | | | |
| 32 | Ex. 1 | | | | 1 mole of diethylmaleate | Mixture of ½ mole of triethylenetetramine and ½ mole of diethylene triamine. |
| 33 | Ex. 1 | | | | 1 mole of dibenzyl maleate | Do. |
| 34 | Ex. 1 | | | | 1 mole of itaconic acid | 2 moles of tripropylenetetramine. |
| 35 | Ex. 1 | 1 mole of phosphosulfurized polyisobutylene (Ex. 1) and 1 mole of phosphosulfurized polypropylene (Ex. 10). | | | | |

[1] Indicates average molecular weight of polymer prior to phosphosulfurization. [2] Number of grams of phosphorus sulfide.
a—Designates omission of sulfur.
NOTE.—The replacement of the polyisobutylene (750) is on substantially an equimolar substitution basis. That is, the average molecular weight of the polyisobutylene polymer of Examples 1–3 is about 750 so that these examples employ about two moles of the polymer. If polypropylene having an average molecular weight of about 1,000 is substituted therefor as in Example 10, about 2,000 grams of the polypropylene polymer will be employed.

While the above illustrative examples are confined to the preparation of the compounds which correspond to the preferred embodiments of the present invention, that is, the reaction products of the phosphosulfurized hydrocarbylene dicarboxylic acid or reactive derivatives thereof with amines, particularly polyethylene polyamines, other derivatives can be prepared in much the same manner by selecting the proper reactants. For example, by replacing all or part of amines utilized in the above examples with a suitable alcohol such as exemplified hereinabove, the corresponding esters can be prepared. Thus, if one-half mole of the diethylene glycol replaces one-half of the amine reactant of Example 1(C), the reaction mass contains esters as well as acylated amines. If all of the amine is replaced with a suitable alcohol, such as pentaerythritol only esters would be produced. By replacing maleic anhydride with a maleic ester, the ester can be prepared directly as in Examples 9, 32, and 33. Compounds where the carboxylic groups are to be carboxyl per se can be prepared by replacing the maleic anhydride of Example 1(B) with maleic acid as illustrated in Example 24. If this product is neutralized with an inorganic or organic base, the corresponding metal or amine salt is produced. Likewise, replacement of all or part of the maleic anhydride of Example 1 with the corresponding acid halide such as succinoyl chloride will produce the corresponding phosphosulfurized carboxylic acid halide derivatives. Such manipulations, being conventional applications of known types of reactions, are well within the skill of the art and do not require further elaboration herein.

The analagous products prepared from other hydrocarbylene dicarboxylic acids are easily synthesized simply by substituting for the acids of Examples 1 through 35 whatever other acid or mixture of acids may be desired. Thus, if one or more of the acids corresponding to Formula II or III is substituted for the maleic acid, anhydrides, esters, etc., of Examples 1 through 35, the corresponding phosphosulfurized dicarboxylic acid derivatives of the particular acid or mixture of acids employed are prepared.

As previously indicated, those products where the carboxyl group have been converted to one of the possible reaction products with an amine, i.e., an amine salt, an amide, an imide, or an amidine, are particularly suitable as dispersants in detergents for lubricating oils. However, the esters and metal salts are also effective dispersants. The anhydrides and acyl halides impart extreme pressure properties, rust-inhibiting qualities, and the like to the lubricating composition.

The products of this invention will be employed in lubricating oils, fuel-oil, etc., in an amount ranging from about .0001% to about 30% by weight and generally from about 0.05% to about 10% by weight. The particular application to which the lubricating composition is to be subjected will determine the optimum amount for a particular lubricating composition. Thus, lubricating compositions employed in internal combustion engines normally will contain from about 0.1% to about 5% of the products of the present invention. On the other hand, lubricating compositions for use in gears and diesel engines may contain up to 10% or more of the additives.

In addition to the presently claimed additives, lubricating compositions contemplated by the invention may contain other conventional additives such as detergents of the ash-containing variety, pour point depressants, viscosity index improving agents, extreme pressure agents, anti-foam agents, rust-inhibiting compounds, and oxidation and corrosion inhibiting compounds.

Examples of such additives include the oil soluble neutral and basic salts of alkali or alkaline earth metals with sulfonic acids, carboxylic acids, or organic phosphorus acids characterized by at least one direct carbon-to-phosphorus linkage; chlorinated aliphatic hydrocarbons such as chlorinated wax; organic sulfides such as dibenzosulfides, dibutyltetrasulfide, sulfurized methyl ester of oleic acid, and sulfurized terpene; phosphosulfurized hydrocarbons such as the reaction products of a phosphorus sulfide with turpentine or methyl oleate; phosphorus esters such as the trihydocarbon phosphites exemplified by tridecylphosphite and triphenylphosphite; methylthiocarbonates such as zinc dioctyldithiocarbonate; Group II metal phosphorodithioates such as zinc dioctylphosphorodithioate; and the like.

The amounts of these various additives which are to be included within the compositions of the present invention can vary over very wide ranges well known in the art, that is, from about 0.1% to about 20% by weight. Normally, however, the additives will be present in an amount of from about 0.1% to about 10% by weight. Obviously, the amount of each additive and the desirability of including a particular additive will depend primarily on the application to which the lubricant is to be applied.

Examples of suitable lubricating compositions are given below:

EXAMPLE I

SAE 10W–30 mineral lubricating oil containing 0.5% of the product of Example 1.

EXAMPLE II

SAE 30 mineral lubricating oil containing 1.5% of the product of Example 2.

EXAMPLE III

SAE 10W–30 mineral lubricating oil containing 6% by weight of the product of Example 10.

EXAMPLE IV

SAE 10 mineral lubricating oil containing 2% of the product of Example 13, 0.075% of phosphorus as the adduct of zinc di-cyclohexylphosphorodithioate treated with 0.3 mole of ethylene oxide, 2% of sulfurized sperm oil having a sulfur content of 10%, 3.5% of a poly-(alkylmethacrylate) viscosity index improver, 0.02% of a poly-(alkylmethacrylate) pour point depressant, and 0.003% of a poly-(alkylsiloxane) anti-foam agent.

EXAMPLE V

SAE 20 mineral lubricating oil containing 1.5% of the product of Example 19, 0.5% of di-dodecylphosphite, 2% of the sulfurized sperm oil having a sulfur content of 9%, 2% of a basic calcium detergent prepared by carbonating a mixture comprising mineral oil, calcium mahogany sulfonate, and 6 moles of calcium hydroxide in the presence of an equimolar composition (10% by weight of the mixture) of methyl alcohol and normal butyl alcohol as the promoter at the reflux temperature.

Examples I–V are merely illustrative of the possible combinations of lubricant compositions falling within the scope of the present invention.

In addition to their properties making them useful as lubricant additives, the compounds of the present invention are useful as additives for fuel oils, diesel fuels, and other hydrocarbon fuels. They are also useful dispersants in paints and plastics or any other material in which they are soluble. They also impart desirable properties to asphalt compositions.

What is claimed is:

1. A lubricant composition comprising a major amount of a mineral lubricating oil and a dispersant amount of an oil-soluble, nitrogen-containing reaction product prepared by first reacting at least one ethylenically unsaturated aliphatic dicarboxylic acid acylating agent of the formula

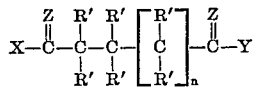

wherein each R' is independently hydrogen or an aliphatic hydrocarbon radical where at least one R' variable contains at least one ethylenic bond or a pair of R' variables on the same or adjacent carbon atoms together form an additional double bond so that there is at least one ethylenically unsaturated bond in the hydrocarbylene group joining

and

$n$ is 0 or an integer of one to eight, and

and

each independently represent

and the corresponding anhydrides of such acylating agents, with (B) at least one phosphosulfurized hydrocarbon containing at least fifty aliphatic carbon atoms in an equivalent ratio of (A) to (B) of 1:0.5 to about 1:3 at a temperature of about 50° C. to about 350° C. to form the first reaction product and subsequently reacting said first reaction product with (C) at least one amine having at least one primary or secondary amino group present therein at a temperature of about 50° C. to about 250° C.; said amine being a mono- or polyamino aromatic, aliphatic, cycloaliphatic, or heterocyclic amine and where the mole ratio of said first reaction product to (C) is about 1:0.5 to about 1:3.

2. A lubricating composition according to claim 1 wherein said oil-soluble, nitrogen-containing reaction product is present in an amount of about 0.05% to about 10% by weight.

3. A lubricating composition according to claim 1 where the oil-soluble, nitrogen-containing reaction product is prepared by first reacting (A) at least one acidic reactant selected from the class consisting of maleic acid, chloromaleic acid, alkylated maleic acid, itaconic acid, and the anhydrides and lower alkyl esters thereof with (B) at least one phosphosulfurized polyolefin wherein the polyolefin portion has a molecular weight of about 700 to about 5000 in an equivalent ratio of (A) to (B) of about 1:0.5 to about 1:3 at a temperature of about 100° C. to about 250° C. to form the first reaction product and subsequently reacting said first reaction product with (C) at least one alkylene polyamine having at least one primary or secondary amino group present therein at a temperature of about 50° C. to about 250° C.

4. A lubricating composition according to claim 3 wherein said first reaction product is prepared by reacting (A) at least one acidic reactant selected from the group consisting of maleic acid and maleic anhydride with (B) phosphosulfurized polymer of 1-monoolefin.

5. A lubricating composition according to claim 4 wherein the alkylene polyamine is ethylene polyamine.

6. A lubricating composition according to claim 5 wherein said phosphosulfurized polymer of 1-monoolefin is phosphosulfurized polyisobutylene.

7. A lubricating composition according to claim 6 wherein said oil-soluble, nitrogen-containing reaction product is present in an amount of about 0.1% to about 5% by weight.

References Cited

UNITED STATES PATENTS

| | | | |
|---|---|---|---|
| 2,992,184 | 7/1961 | Baptiste et al. | 252—46.6 |
| 3,185,646 | 5/1965 | Anderson et al. | 252—46.7 |
| 3,235,497 | 2/1966 | Lee | 252—46.7 |
| 3,294,684 | 12/1966 | McNinch et al. | 252—46.7 |
| 3,342,735 | 9/1967 | Reed | 252—46.7 |
| 3,359,203 | 12/1967 | O'Halloran | 252—46.6 |

DANIEL E. WYMAN, *Primary Examiner.*

W. CANNON, *Assistant Examiner.*

U.S. Cl. X.R.

44—63, 72; 252—34.7, 42.1, 40.7; 260—125